(12) United States Patent
Kampf

(10) Patent No.: US 8,206,226 B2
(45) Date of Patent: Jun. 26, 2012

(54) TORQUE LIMITING COUPLING

(75) Inventor: Klaus Kampf, Lohmar (DE)

(73) Assignee: GKN Walterscheid GmbH (DE)

( * ) Notice: Subject to any disclaimer, the term of this patent is extended or adjusted under 35 U.S.C. 154(b) by 203 days.

(21) Appl. No.: 12/244,914

(22) Filed: Oct. 3, 2008

(65) Prior Publication Data

US 2009/0093316 A1    Apr. 9, 2009

(30) Foreign Application Priority Data

Oct. 4, 2007  (DE) .......................... 10 2007 047 635

(51) Int. Cl.
F16D 7/08 (2006.01)
(52) U.S. Cl. ......................................................... 464/36
(58) Field of Classification Search .................... 464/10, 464/30, 35, 36, 37–39; 192/54.1, 55.1, 56.1, 192/56.54, 56.57, 56.6
See application file for complete search history.

(56) References Cited

U.S. PATENT DOCUMENTS

| | | | |
|---|---|---|---|
| 2,775,327 A | | 12/1956 | Gearhart |
| 2,927,672 A | * | 3/1960 | Banner ............................ 464/36 |
| 3,942,337 A | * | 3/1976 | Leonard et al. ................. 464/36 |
| 4,075,873 A | | 2/1978 | Geisthoff |
| 4,226,316 A | | 10/1980 | Geisthoff |
| 4,294,340 A | | 10/1981 | Kunze |
| 4,373,923 A | * | 2/1983 | Kilwin ............................ 464/36 |
| 4,538,715 A | * | 9/1985 | Konrad et al. ............. 192/56.57 |
| 5,005,684 A | * | 4/1991 | Fujii ................................ 464/36 |
| 5,060,771 A | | 10/1991 | Robinson |
| 5,092,441 A | * | 3/1992 | Fujii .......................... 192/56.54 |
| 5,383,818 A | | 1/1995 | Lessat-Kaupat et al. |
| 6,206,784 B1 | * | 3/2001 | Kato ............................... 464/36 |
| 6,312,339 B1 | | 11/2001 | Beyert |
| 6,799,666 B2 | | 10/2004 | Kampf |
| 2003/0051966 A1 | | 3/2003 | Sproatt et al. |

FOREIGN PATENT DOCUMENTS

| | | |
|---|---|---|
| DE | 745 147 | 2/1944 |
| DE | 1 030 632 | 2/1964 |
| DE | 1 211 874 | 3/1966 |
| DE | 87 05 901.0 | 6/1987 |
| DE | 41 21 892 A1 | 1/1993 |
| DE | 10201988 C2 | 12/2003 |
| DE | 197 34 467 B4 | 9/2004 |
| EP | 1 219 391 A2 | 7/2002 |
| GB | 939490 | 10/1963 |

* cited by examiner

Primary Examiner — Gregory Binda
Assistant Examiner — Josh Skroupa
(74) Attorney, Agent, or Firm — Harness, Dickey & Pierce, P.L.C.

(57) ABSTRACT

In order to increase an automatic connecting speed at a torque limiting coupling, a torque limiting coupling (1) has a coupling hub (5). Driving elements (8) are adjustably held in the apertures and extend parallel to the longitudinal axis. A coupling sleeve has first recesses (23) corresponding to the apertures. A switching disc (14) is rotatably arranged between a connected position and a freewheeling position, relative to the coupling hub. The switching disc (14) can be transferred by a rolling movement of the driving elements (8) from the connected position into the freewheeling position. The switching disc (14) has second recesses (34) that engage the driving elements (8) in the freewheeling position. A first and second spring mechanism load the switching disc (14) in the circumferential and axial direction. Circumferential play (28) is formed between the driving elements (8) and the first recesses (23) in the connected position.

6 Claims, 3 Drawing Sheets

TORQUE LIMITING COUPLING

CROSS-REFERENCE TO RELATED APPLICATION

This application claims priority to German Patent Application No. 102007047635.5 filed Oct. 4, 2007, which application is herein expressly incorporated by reference.

FIELD

The disclosure relates to a torque limiting coupling and, more particularly, to a torque limiting coupling rotatably arranged around a longitudinal axis. A coupling hub with circumferentially distributed apertures adjustably holds driving elements that extend parallel to the longitudinal axis. A coupling sleeve includes first recesses that correspond to the apertures. A switching disc is rotatably arranged between a connected position, where the driving elements engage the first recesses to transmit torque, and a freewheeling position relative to the coupling hub. The switching disc, if a predetermined nominal torque is exceeded, is transferred by a rolling movement of the driving elements from the connected position into the freewheeling position. The switching disc includes second recesses that correspond to the apertures. The second apertures are engaged by the driving elements in the freewheeling position. A first spring mechanism loads the switching disc in the circumferential direction towards the switching position. A second spring mechanism axially loads the switching disc and thus loads the driving elements indirectly towards the coupling hub.

BACKGROUND

Torque limiting couplings are sufficiently known from the state of the art. More particularly, they can be used very effectively to protect force- and/or torque-transmitting components of a driveline from critical loads. If the torque limiting couplings are overloaded, they are able to reduce or even completely interrupt transmission of forces or torque between the input end and the output end of a driveline. It goes without saying that such torque limiting couplings are available in a large number of designs.

For example, patent specification DE 102 01 988 C2 proposes a torque limiting coupling that makes it possible, if an overload occurs in a driveline with rotating parts, to interrupt the transmission of force and/or torque. After the elimination of the overload, the coupling enables subsequent automatic connection of the torque limiting coupling at a low connecting speed. Normally, the connecting speed amounts to approximately 100 rpm. If automatic connection of the torque limiting coupling is not desirable, it is possible, even at a very small number of revolutions, to maintain an emergency disconnection of the torque limiting coupling. This prevents automatic reconnection of the torque limiting coupling by actuating a suitable latch.

The torque limiting coupling described in DE 102 01 988 C2 has an emergency disconnection characteristic. Thus, components of a driveline are well protected in the case of an overload. In addition, it offers the possibility of preventing automatic re-connection of the torque limiting coupling when the speed is reduced.

With respect to the driveline torque transmitting components or if a driveline stoppage occurs, in some cases it is undesirable for a released torque limiting coupling not to be re-connected unless a massive reduction in speed, e.g. approximately 100 rpm, takes place. Especially in the case of short-term overloading, the cause of which is usually eliminated automatically, the working process is often interrupted for an unnecessarily long period if the speed in the driveline is reduced. Thus, the working machine subsequently must be restarted.

SUMMARY

It is therefore an object of the present disclosure to provide a torque limiting coupling that make it possible to achieve a higher re-connecting speed.

In accordance with the disclosure, the objective is achieved by providing an initially described torque limiting coupling wherein, in the connected position, a circumferential play is provided between the driving elements and the first recesses.

In practice, it has been found that by providing such a circumferential play between the driving elements and the first recesses, it is possible for a released torque limiting coupling to be re-connected at higher connecting speeds, in practice in excess of 100 rpm. The circumferential play formed between the driving elements and the first recesses can be used to prolong the insertion time of the driving elements into the first recesses during the re-engagement of the driving elements into the first recesses when transferring the driving elements from the freewheeling position into the connected position.

In this way, advantageously even at higher speeds, e.g. in excess of 100 rpm, the driving elements can enter the first recesses sufficiently deeply without being able, undesirably, to jump out of the first recesses. Thus, force and/or torque-locking can be achieved again between the input end and the output end of the driveline. The speeds described here refer to rotating parts in a driveline and, more particularly, to a torque limiting coupling that is able to rotate with the driveline at these speeds.

According to a first variant of an embodiment, the first recesses are longer in the circumferential direction than the driving element portions engaging the first recesses. Because the first recesses are longer in the circumferential direction than the driving elements engaging the first recesses, it is easy from a design standpoint to provide a circumferential play between the driving elements and the first recesses.

The term "portion" describes regions of the driving elements that, provided the torque limiting coupling is accurately connected, are arranged in the first recesses.

Furthermore, even if greater masses are to be driven, the present torque limiting coupling, after being disconnected, in an advantageous way, enables a more rapid speed increase, due to the increased re-connecting speed, without running the risk of the driving elements, due to their high mass inertia, being pushed too soon out of the first recesses. Thus, the starting time of the working machine can be considerably shortened.

It goes without saying that it is possible for differently designed driving elements to enable force and/or torque-locking, in the form of interaction, with the first recesses. For example, driving elements in the form of balls can be provided, as described, in the initially mentioned patent specification.

However, according to a preferred embodiment, the driving elements are in the form of rollers. The rollers are rotatable around axes of rotation that extend radially relative to the longitudinal axis. Rollers are advantageous as compared to the balls. The rollers are able to transmit higher torque values. Needless to say, the rollers can differ geometrically, for example, they can be drum-shaped or conical.

If the rollers are cylindrical, it is particularly easy to produce the corresponding first recesses in simple shape. As a result, other components of the first recesses are easy to produce.

The circumferential play between the driving elements and the first recesses is particularly easy to achieve with cylindrical rollers. Additionally, the first recesses include a surface contour with a concave curvature that differs, at least partially, from a convex curvature of the surface contour of the driving element and, more particularly, the roller surface.

If the driving elements are in the form of balls, it is advantageous if the circumferential extension of the surface contours of the recesses differs from a radial extension.

With the help of the above-described first recesses, more particularly, in cooperation with the driving elements, it is possible to provide an advantageous mechanism to transfer the driving elements into a connected position at a connecting speed in excess of 200 rpm. Additionally, at a connecting speed of 300 rpm. On the other hand, an advantageous mechanism provides prolong insertion time of the driving elements in the first recesses during the re-engagement of the driving elements in the first recesses when transferring the driving elements from the freewheeling position into the connected position.

Also, it is possible to modify the connection behaviour of existing torque limiting couplings. For example, one replaces a coupling sleeve with the first recesses with a coupling sleeve that includes recesses that, in the connected position, are provided with circumferential play relative to the driving elements.

Further advantages, objectives and characteristics of the present disclosure will be explained with reference to the following description of the attached drawings that diagrammatically illustrate torque limiting coupling with a coupling sleeve that includes recesses which are longer in the circumferential direction.

DRAWINGS

The drawings described herein are for illustrative purposes only of selected embodiments and not all possible implementations, and are not intended to limit the scope of the present disclosure.

DETAILED DESCRIPTION

The following description is merely exemplary in nature and is not intended to limit the present disclosure, application, or uses.

Figure 1:
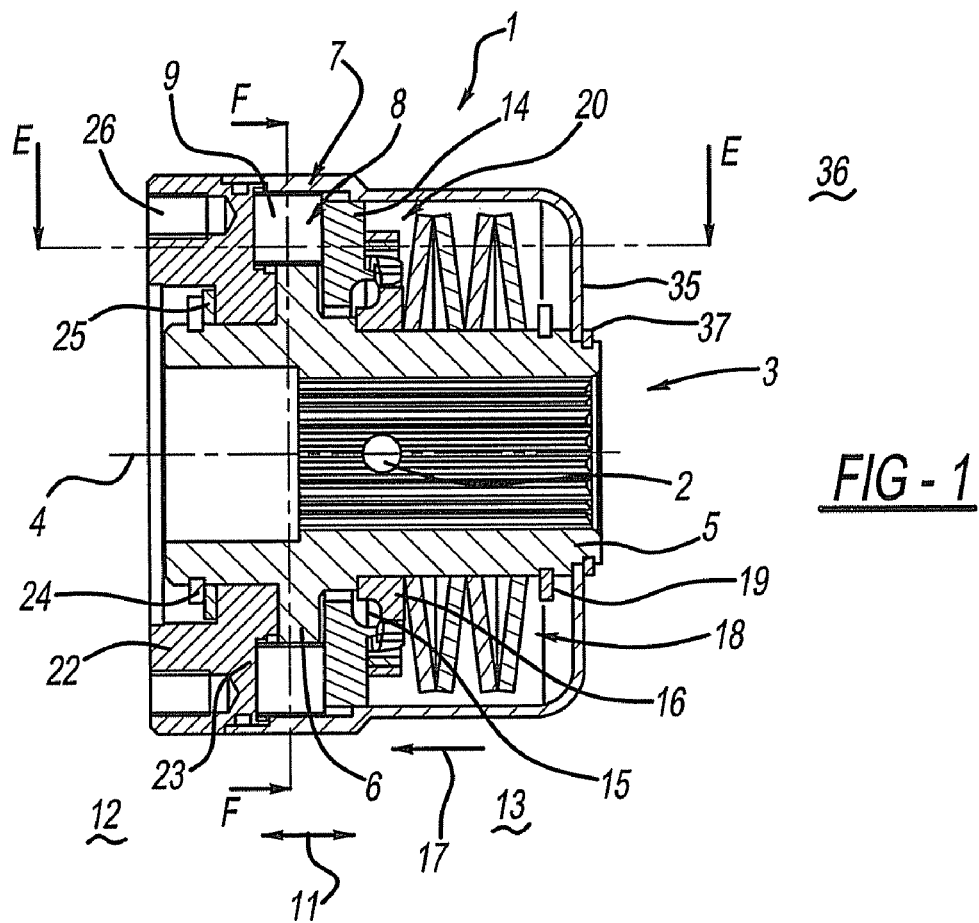
FIG. 1 is a longitudinal section view through a torque limiting coupling.

The torque limiting coupling 1 shown in FIG. 1 is connected to a shaft journal (not illustrated) by splines 3, defining a bore 2, in a form-locking and rotationally fast way. The torque limiting coupling 1 and the shaft journal are able to rotate around a common axis of rotation 4.

The torque limiting coupling 1 includes a coupling hub 5 slid onto the shaft journal. On its radial outside, the coupling hub 5 includes a concentrically extending coupling flange 6. A total of eight apertures 7 are concentrically arranged around the common axis of rotation 4. They are given reference numbers by way of example only (see FIG. 3).

The apertures 7 receive driving elements 8. In this embodiment, the driving elements 8 are in the form of cylindrical rollers. The driving elements 8 are supported around the axis of rotation 10 of the driving elements 8 within the apertures 7 (see FIG. 3). In accordance with the double arrow 11 and depending on the connected/disconnected condition of the torque limiting coupling according to FIG. 1, the driving elements 8 can be displaced in the apertures 7. In the left hand side 12, they are in the connected condition. In the right hand side 13, they are in the freewheeling condition.

Primarily, in the operating condition, force and/or torque is transmitted by the torque limiting coupling. The driving elements are in their connected condition. The driving elements are pushed, by force, towards the left hand side 12. The driving elements 8 are force-loaded by a spring-assisted switching disc 14 towards the left hand side 12.

The switching disc 14 is permanently pressed by spring forces 17 of a plate spring package 18, via a pressure bearing 15 and a pressure ring 16, towards the concentrically rotating coupling flange 6. The pressure ring 16 is rotationally secured and axially displaceably arranged on the coupling hub 5. The switching disc 14 is rotatable relative to the pressure ring 16 via the pressure bearing 15. Together with the pressure ring 16, the switching disc 14 can be axially adjusted on the coupling hub 5 against the spring force of the plate spring package 18. The plate spring package 18 is axially supported against the pressure ring 16, on the one hand, and against a supporting ring 19, on the other hand. A clamp package 20 is supported in the circumferential direction against the pressure ring 16, on the one hand, and against the switching disc 14, on the other hand. This loads the switching disc 14 into a rotational position relative to the pressure ring 16. The rotational position corresponds to the connected position.

Figure 2:
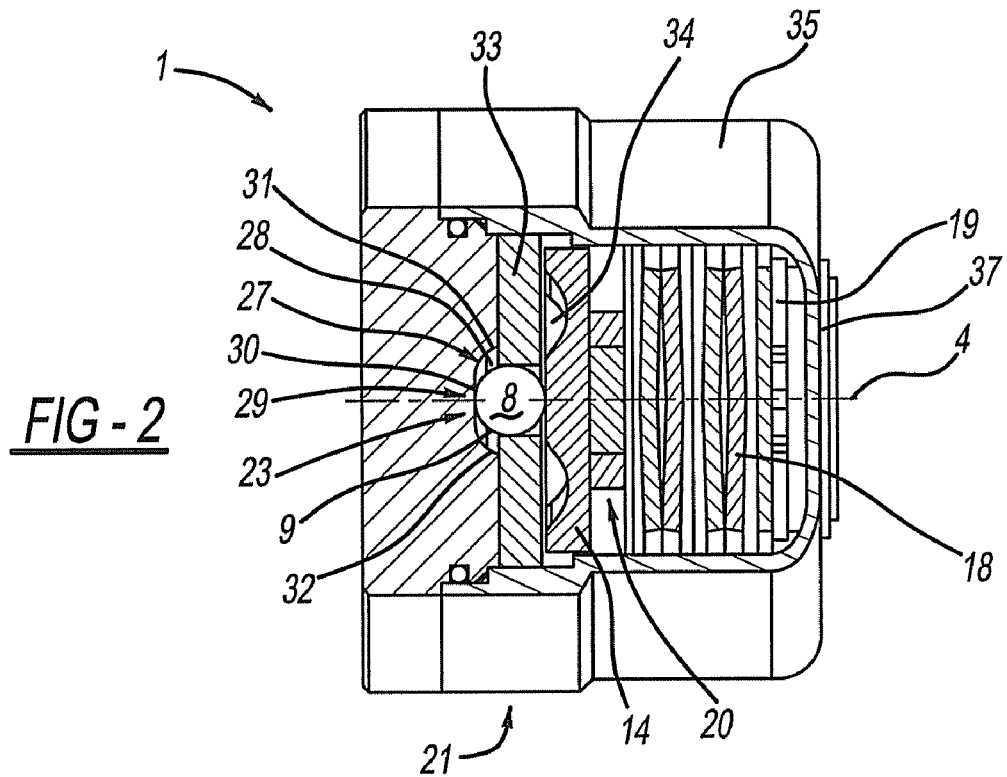
FIG. 2 is a further longitudinal section view along a sectional line E-E of FIG. 1.

In the connected position or in the operating condition of the torque limiting coupling according to FIGS. 1 and 2, the driving elements 8 are in a coupled position relative to a coupling sleeve 22. The driving elements 8 are arranged at the coupling sleeve 22 in first recesses 23 of the torque limiting coupling 1. The first recesses 23 are arranged at the coupling sleeve 22. Thus, they extend concentrically around the common axis of rotation 4.

A supporting ring 24 and an intermediate disc 25 secure the coupling sleeve 22 on the left hand side 12 at the coupling hub 5. The coupling sleeve 22 includes threaded bores 26 that connect to a component (not shown) at the input end or output end.

FIG. 2 shows one of the first recesses 23 in a cross-sectional view. In this embodiment, the recesses 23 include a ladle-shaped surface contour 27. Thus, a circumferential play 28 occurs between the driving elements 8, which in this embodiment are provided in the form of cylindrical rollers 9. The circumferential play 28, if viewed in the circumferential direction of the coupling sleeve 22, occurs on both sides of the cylindrical rollers 9. This is due to the ladle-shaped surface contour 27 in the region of its vertex 29, including a bottom region 30 of the first recesses 23.

Under load conditions, the driving members 8, depending on the direction of rotation, rest against one of the curved side regions 31 or 32. The side regions 31, 32 are located between the planar bottom region 30 and a planar running face 33 of the coupling sleeve 22. The side regions 31, 32 complete the ladle-shaped surface contour 27.

If overloading occurs, the switching disc 14 is rotated relative to the coupling sleeve 22 around the common axis of rotation 4. The second recesses 34 of the torque limiting coupling that are arranged at the switching disc 14 overlap the apertures 7 in the concentrically rotating coupling flange 6. The switching disc 14 continues to be force-loaded in the circumferential direction by the clamp package 20 towards entering the connected position. The spring forces automatically displace back into its connected position as soon as overloading discontinues and as soon as the torque limiting coupling 1 rotates at a suitable speed.

Thus, in the case of overloading, the coupling sleeve 22 and the coupling hub 5 rotate relative to one another. The driving members 8 push the switching disc 14 against the spring forces 17. The plate spring package 18 is compressed as a result. Thus, the driving members 8 can be displaced into the second recesses 34 of the switching disc 14. As a result, the force-locking connection between the coupling sleeve 22 and the coupling hub 5 is interrupted. Once the driving members 8 have been moved into the second recesses 34, the torque limiting coupling 1 is in a freewheeling position. Thus, the force and torque locking effect between an input end and an output end is interrupted. As a result, any damage to the driveline can be prevented.

Once the overload condition has been eliminated, it is possible, as described above, by reducing the speed, to transfer the coupling from the freewheeling position into the connected position 21. Thus, the driving elements 8 can be displaced back into the first recesses 23. In this embodiment, the recesses 23 include a ladle-like surface. Thus, a longer period of time is available for the driving elements 8 to enter the first recesses 23 before they abut one of the curved side regions 31 and 32, respectively. This additional period of time ensures that the driving elements 8 can enter the first recesses 23 much more deeply, ideally completely.

The first recesses 23, if viewed in the circumferential direction, are wider. This ensures that the driving elements 8 are able to enter the first recesses 23 in an operationally safe way at a substantially higher connecting speed. Thus, the torque limiting coupling 1 is ready for operation much sooner. To that extent, the first recesses 23, with their ladle-like surface contours 27, constitute an advantageous mechanism to prolong the insertion time of the driving elements into the first recesses 23 during the re-engagement of the driving elements 8 into the first recesses 23, thus transferring the driving elements from the freewheeling position into the connected position.

The torque limiting coupling 1 includes a housing 35 that protects the above-mentioned components and assemblies of the torque limiting coupling 1 against influences of the environment 36. When the housing 38 abuts the coupling sleeve 22, it is held by a securing ring 37 on the coupling hub 5.

Figure 3:
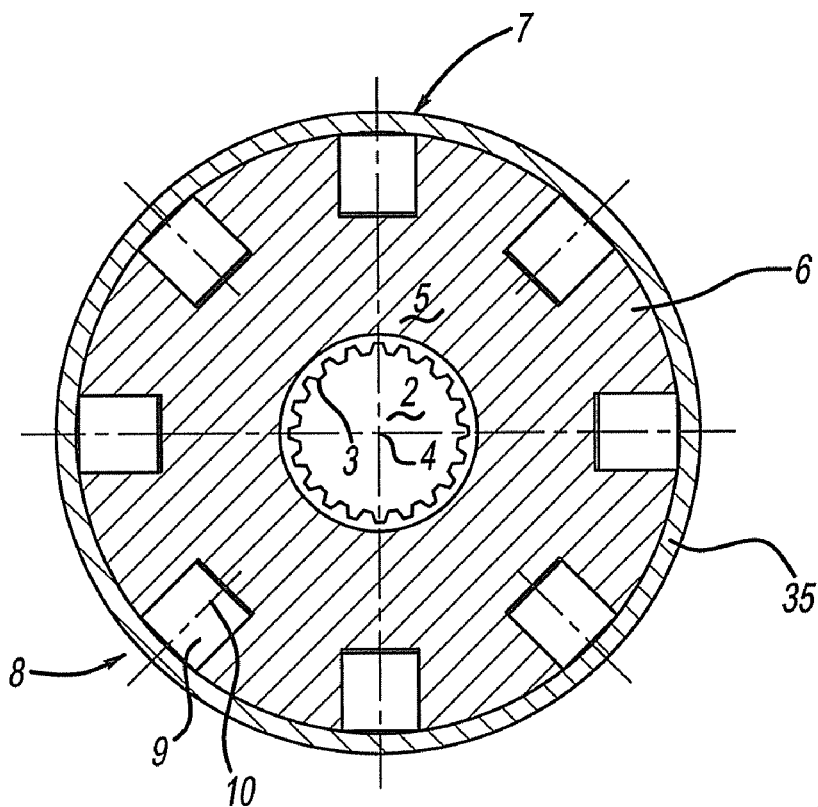
FIG. 3 is a cross-section view along a sectional line F-F of FIG. 1.

In the cross-section through the concentrically rotating coupling flange 6 of the coupling hub 5 shown in FIG. 3, it is easy to identify the apertures 7 that rotate concentrically around the common axis of rotation 4. The driving elements 8 are arranged in the apertures 7 to rotate around their respective driving element axis 10. Thus, the driving elements 8 can roll in a problem-free way on the planar running face 33 of the coupling sleeve 22. The apertures 7 at the concentrically rotating coupling flange 6 are radially closed by the housing 35. The housing 35 is slid over the coupling flange 6 and secured to the coupling hub 5.

Figure 4:
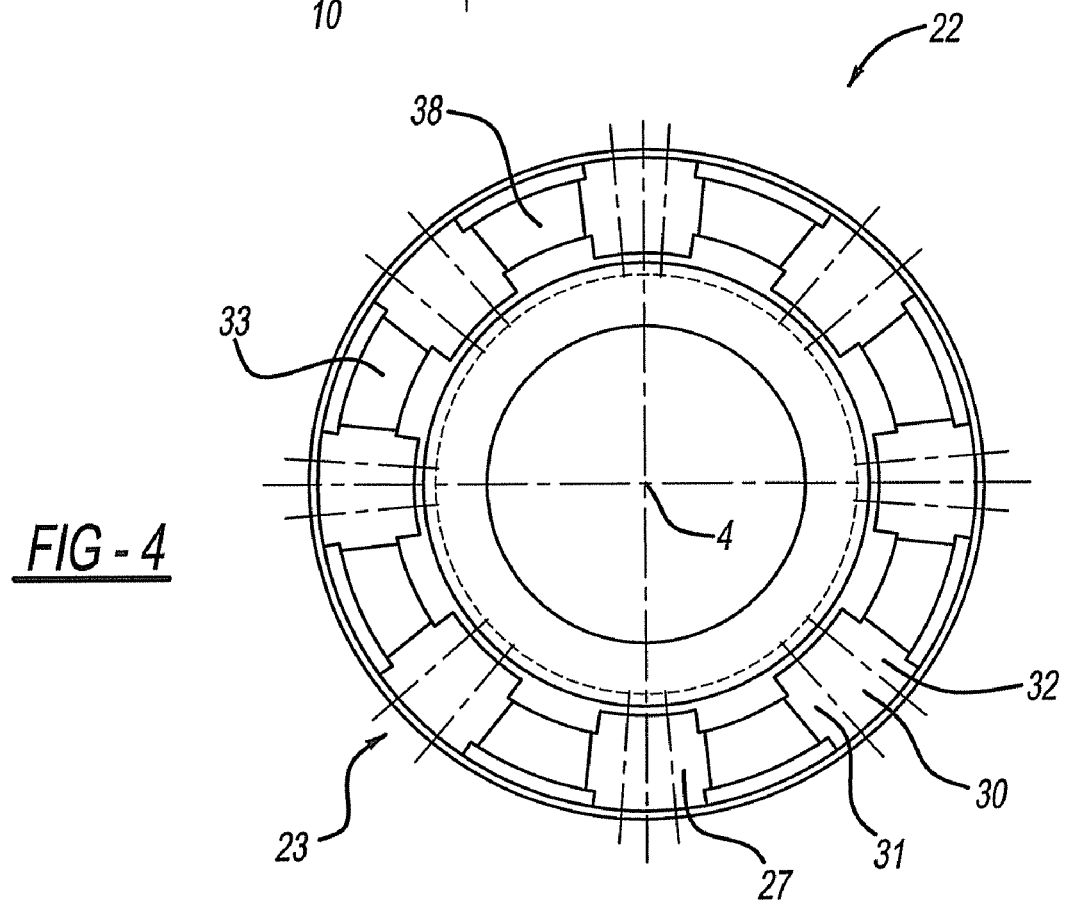
FIG. 4 is a plan view of a coupling sleeve whose first recesses are longer in the circumferential direction.

FIG. 4 illustrates the coupling sleeve 22 as viewed from the switching disc 14. Similarly to the apertures 7 of the coupling hub 5, the coupling hub 22 is provided with a total of eight first recesses 23. The recesses 23 are arranged to extend concentrically around the common axis of rotation 4. Running face segments 38 are arranged between the first recesses 23. The running face segments 38 provide the planar running faces 33 at the coupling sleeve 22.

The ladle-shaped surface contour 27, via its curved side regions 31 and 32, respectively, adjoins the running face segments 38. Between the two curved side regions 31 and 32, a planar bottom region 30 is provided at each ladle-shaped surface contour 27.

Figure 5:
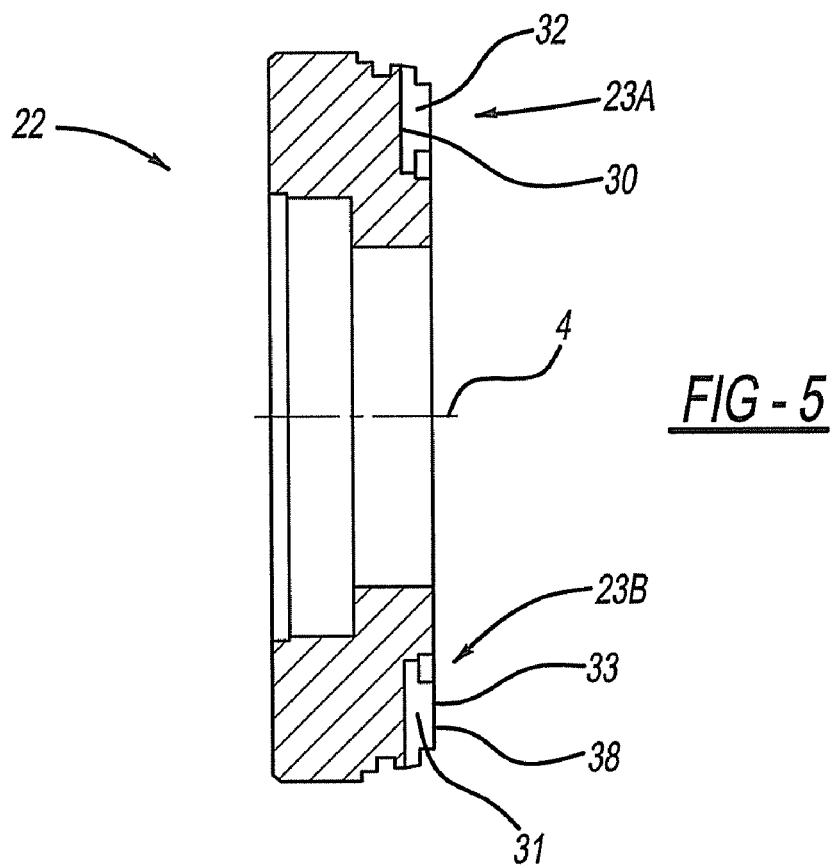
FIG. 5 is a longitudinal section through the coupling sleeve according to FIG. 4.

In the longitudinal section through the coupling sleeve 22, as illustrated in FIG. 5, it is possible, in the region of two opposed recesses 23A and 23B, to identify in the upper region of the coupling sleeve 22, a second curved side region 32 of the upper first recess 23A. It is also easy to see the planar bottom region 30. The running face segment 38 has its planar running face 33 adjoining the second curved side region 32 at the lower first recess 23B in the lower region of the coupling sleeve 22. At the lower first region 23B, in the lower region of the coupling sleeve 22, a first curved side region 31 of a ladle-shaped surface structure 27 is provided for the planar running face 33 of a running face segment 38.

Figure 6:
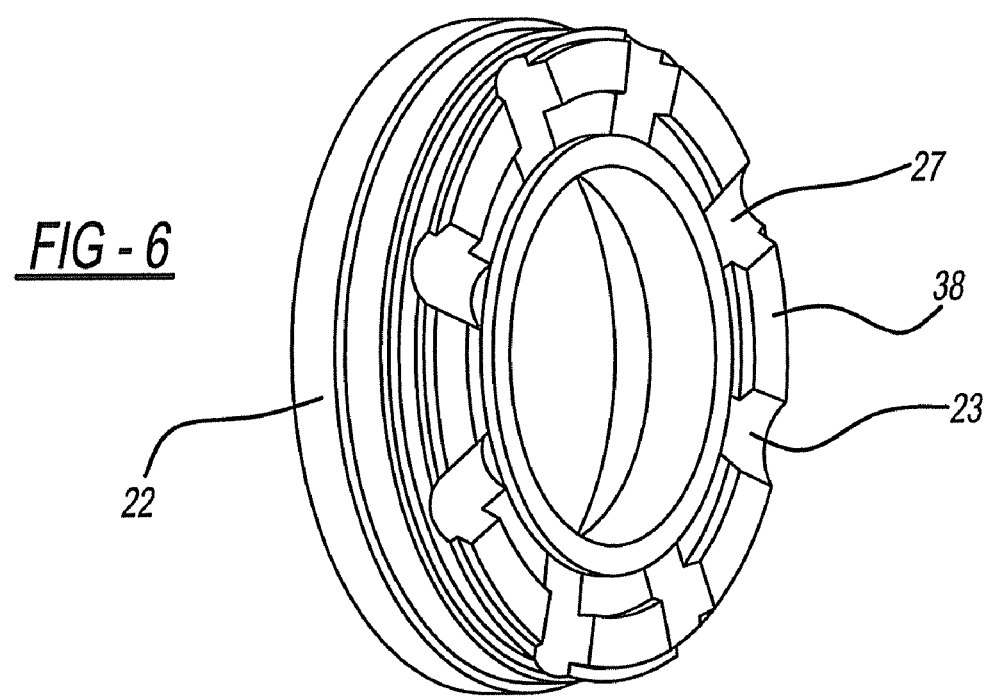
FIG. 6 is a perspective view of the coupling sleeve according to FIGS. 4 and 5.

In the illustration of FIG. 6, the coupling sleeve 22 is shown in a perspective view from the direction of the switching disc 14. Thus, it very easy to identify the arrangement of the first recesses 23 with the ladle-shaped surface contours 27 and the running face segments 38 in an alternating arrangement.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A torque limiting coupling defining a longitudinal axis comprising:

a coupling hub with circumferentially distributed apertures;

driving elements are adjustably held in the apertures parallel to the longitudinal axis;

a coupling sleeve including first recesses corresponding to the apertures;

a switching disc is rotatably arranged between a connected position, where the driving elements engage the first recesses for torque transmitting purposes, and a freewheeling position relative to the coupling hub, said switching disc, if a predetermined nominal torque is exceeded, can be transferred by a rolling movement of the driving elements from the connected position into the freewheeling position, said switching disc including second recesses that correspond to the apertures and are engaged by the driving elements in the freewheeling position;

a first spring mechanism loads the switching disc in the circumferential direction towards the connected position;

a second spring mechanism axially loads the switching disc and thus loads the driving elements indirectly towards the coupling hub; and a circumferential play is formed between the driving elements and the first recesses when the switching disc is in its connected position, the circumferential play is created by the first recesses having a surface contour with a concave curvature that at least partly differs from a convex curvature of the surface contour of a driving element, wherein the first recesses include an approximately planar bottom region.

2. The torque limiting coupling according to claim 1, wherein the first recesses in the circumferential direction are longer than the portions of the driving elements that engage the first recesses.

3. The torque limiting coupling according to claim 1, wherein the driving elements are rollers that are rotatable around axes of rotation arranged radially relative to the longitudinal axis.

4. The torque limiting coupling according to claim 3, wherein the rollers are cylindrical.

5. The torque limiting coupling according to claim 1, wherein the driving elements and the first recesses are designed so that the driving elements can be transferred into a connected position at a connecting speed in excess of 200 rpm.

6. The torque limiting coupling according to claim 1, wherein the driving elements and the first recesses are designed so that the driving elements can be transferred into a connected position at a connecting speed in excess of 300 rpm.

* * * * *